(12) United States Patent
Holden et al.

(10) Patent No.: US 12,219,222 B2
(45) Date of Patent: *Feb. 4, 2025

(54) NON-TEMPORAL ADVERTISING

(71) Applicant: Comcast Cable Communications, LLC, Philadelphia, PA (US)

(72) Inventors: Danial Holden, Littleton, CO (US); Aljit Joy, Huntingdon Valley, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,869

(22) Filed: Feb. 24, 2023

(65) Prior Publication Data

US 2023/0199273 A1 Jun. 22, 2023

Related U.S. Application Data

(63) Continuation of application No. 17/144,787, filed on Jan. 8, 2021, now Pat. No. 11,601,730, which is a continuation of application No. 16/243,951, filed on Jan. 9, 2019, now Pat. No. 10,917,701, which is a continuation of application No. 15/175,557, filed on Jun. 7, 2016, now Pat. No. 10,225,623.

(51) Int. Cl.
*H04N 21/81* (2011.01)
*H04H 20/10* (2008.01)
*H04H 60/12* (2008.01)
*H04N 21/234* (2011.01)
*H04N 21/235* (2011.01)
*H04N 21/84* (2011.01)

(52) U.S. Cl.
CPC ........ *H04N 21/814* (2013.01); *H04H 20/106* (2013.01); *H04H 60/12* (2013.01); *H04N 21/23424* (2013.01); *H04N 21/235* (2013.01); *H04N 21/812* (2013.01); *H04N 21/84* (2013.01)

(58) Field of Classification Search
CPC ........... H04N 21/23424; H04N 21/235; H04N 21/812; H04N 21/814; H04N 21/84; H04H 20/106; H04H 60/12
See application file for complete search history.

(56) References Cited

U.S. PATENT DOCUMENTS

| 8,413,183 B2* | 4/2013 | Kunkel | H04N 21/475 725/36 |
| 8,670,649 B1* | 3/2014 | Khadiwala | H04N 21/23418 725/35 |
| 8,997,131 B1* | 3/2015 | Velummylum | H04N 21/2668 725/35 |

(Continued)

OTHER PUBLICATIONS

"Replace, V." Oxford English Dictionary, Oxford UP, Jul. 2023, https://doi.org/10.1093/OED/5650153773. (Year: 2023).*

(Continued)

*Primary Examiner* — Michael B. Pierorazio
(74) *Attorney, Agent, or Firm* — Ballard Spahr LLP

(57) ABSTRACT

Methods, systems, and apparatuses are described herein for providing alternate content in place of other content based on an issue associated with receiving the other content. The alternate content may be an advertisement associated with the other content. Output of the other content may resume once the issue is resolved and/or after output of the alternate content has concluded.

27 Claims, 7 Drawing Sheets

(56) References Cited

U.S. PATENT DOCUMENTS

| | | | | |
|---|---|---|---|---|
| 10,225,623 B2* | 3/2019 | Holden | ................... | H04H 60/12 |
| 10,917,701 B2* | 2/2021 | Holden | ................... | H04N 21/84 |
| 2002/0162120 A1* | 10/2002 | Mitchell | ............ | H04N 21/8586 |
| | | | | 725/135 |
| 2008/0235733 A1* | 9/2008 | Heie | ..................... | H04N 21/482 |
| | | | | 725/46 |
| 2009/0158326 A1* | 6/2009 | Hunt | ....................... | H04N 5/783 |
| | | | | 725/38 |
| 2010/0131385 A1* | 5/2010 | Harrang | ............. | G06Q 30/0631 |
| | | | | 705/26.1 |
| 2011/0004910 A1* | 1/2011 | Eyer | ................... | H04N 21/4348 |
| | | | | 725/110 |
| 2012/0072272 A1* | 3/2012 | Kilar | .................... | G11B 27/322 |
| | | | | 705/14.4 |
| 2012/0072286 A1* | 3/2012 | Kilar | ................... | H04N 21/4825 |
| | | | | 705/14.55 |
| 2012/0110616 A1* | 5/2012 | Kilar | ....................... | G06Q 30/02 |
| | | | | 725/32 |
| 2012/0110620 A1* | 5/2012 | Kilar | .................... | H04N 21/812 |
| | | | | 725/34 |
| 2013/0198642 A1* | 8/2013 | Carney | .............. | H04N 21/6587 |
| | | | | 715/738 |
| 2014/0013342 A1* | 1/2014 | Swan | ................. | H04N 21/4821 |
| | | | | 725/92 |
| 2014/0373049 A1* | 12/2014 | Carr | ................... | H04N 21/4325 |
| | | | | 725/34 |
| 2015/0019619 A1* | 1/2015 | Daly | ........................ | G06N 7/01 |
| | | | | 709/202 |
| 2015/0067754 A1* | 3/2015 | Wiser | ................... | H04N 21/631 |
| | | | | 725/120 |
| 2015/0121418 A1* | 4/2015 | Jain | .................. | H04N 21/44213 |
| | | | | 725/32 |
| 2015/0199716 A1* | 7/2015 | Gerard | .............. | G06Q 30/0255 |
| | | | | 705/14.53 |
| 2015/0340060 A1* | 11/2015 | Tani | ...................... | H04N 5/913 |
| | | | | 369/84 |
| 2016/0014455 A1* | 1/2016 | Jabara | ................. | H04N 21/632 |
| | | | | 725/27 |
| 2016/0232453 A1* | 8/2016 | Daly | ........................ | G06N 7/01 |
| 2017/0353776 A1 | 12/2017 | Holden et al. | | |

OTHER PUBLICATIONS

"Substitute, N." Oxford English Dictionary, Oxford UP, Mar. 2024, https://doi.org/10.1093/OED/1161569201. (Year: 2024).*

* cited by examiner

NON-TEMPORAL ADVERTISING

CROSS-REFERENCE TO RELATED PATENT APPLICATIONS

This application is a continuation of U.S. patent application Ser. No. 17/144,787, filed on Jan. 8, 2021, and issuing as U.S. Pat. No. 11,601,730 on Mar. 7, 2023, which is a continuation of U.S. patent application Ser. No. 16/243,951, filed on Jan. 9, 2019, and issued as U.S. Pat. No. 10,917,701 on Feb. 9, 2021, which is a continuation of U.S. patent application Ser. No. 15/175,557, filed on Jun. 7, 2016, and issued as U.S. Pat. No. 10,225,623 on Mar. 5, 2019, each of which are incorporated by reference in their entireties herein.

BACKGROUND

Television programs have a given number of, or a given window for, advertising slots where an advertisement is an expected occurrence. Unexpected interruptions, such as network disruptions or alerts, can adversely affect the program viewing experience. What is needed are systems and methods for minimizing an adverse effect on the viewing experience for a program experiencing an unexpected interruption. These and other shortcomings of the prior art are addressed by the present disclosure.

SUMMARY

It is to be understood that both the following general description and the following detailed description are exemplary and explanatory only and are not restrictive. Methods and systems are described herein for masking a network disruption. A plurality of advertisements can be stored locally to a user device. The user device can receive content from a network. In the event that the network experiences a disruption that prevents the user device from receiving the content, the user device can select and present one of the plurality of advertisements. For example, the one of the plurality of advertisements can be presented until the disruption has ended.

In another aspect, methods and systems are described herein for providing an advertisement with an alert. For example, if an alert interrupts a program, an advertisement can be delivered immediately following the alert. The alert can relate to an emergency or a message, such as a message from the President, an Amber Alert, an emergency weather notification and the like. The advertisement can optionally be contextually related to the alert. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
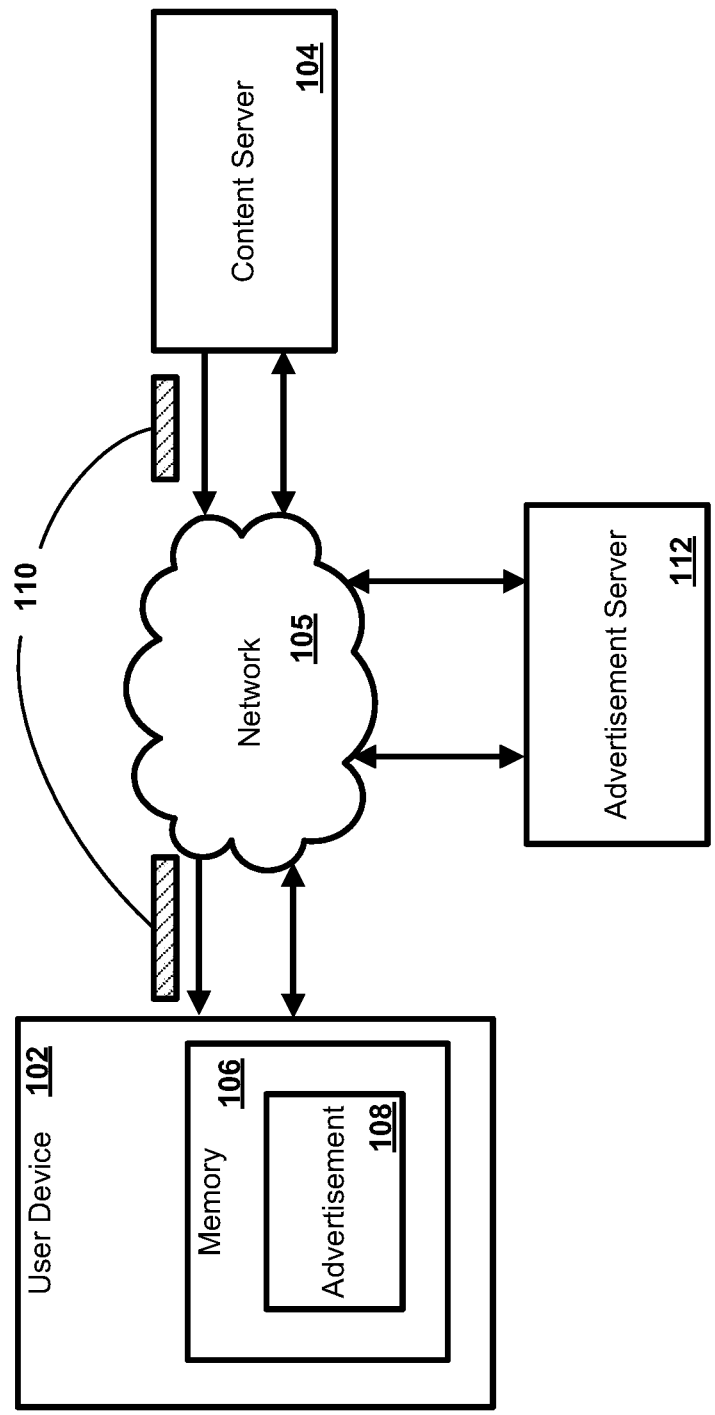
FIG. 1 is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium.

More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Disclosed herein are methods and systems for displaying advertisements when trigger events (e.g., video disruptions), occur. Examples of trigger events include, but are not limited to, video disruptions (e.g., Amber Alerts, Emergency Alert System (EAS), breaking news, political addresses, etc.), network disruptions (e.g., service disruption, hardware failure, etc.), and content triggers (e.g., a noteworthy event/action occurring in video content such as Tiger Woods sinking a putt). Current advertising for linear content is typically based on inserting advertisements at predefined spots (e.g., breaks) in a time line. For instance, a break can be inserted at the top of the hour. For On-Demand content, pre-rolls and post-rolls are commonly used. By caching advertisements at a client device and pre-marking video content with appropriate metadata, advertisements can be dynamically inserted when a trigger event arises. For example, if the trigger event is a network issue, the network issue can be resolved and the client cache can be updated during the playback of the cached advertisement, wherein the playback of the cached advertisement can disguise the network issue currently experienced when viewing streamed content. If the network issue is related to the delivery of content to a user device, but the network is still capable of delivering data, then a cache spot at an edge of the network near a user can transmit an advertisement to the user device. This type of solution can be used, for example, when streaming to mobile devices, vehicles, and other applications where network communication issues are common.

Content delivered to a user can comprise a program. For example, the program can be a movie, a video clip, a television episode, a televised sporting event, and the like. The program can comprise a boundary. The boundary can be an allotted time of the program. A trigger event comprising a video disruption can occur within the boundary of the program. For example, a government notice such as the President of the United States making an announcement related to a proposed agreement with a foreign nation during the allotted time of a basketball game. In response to the trigger event comprising the video disruption, an advertisement can follow the video disruption. The advertisement can be related to the trigger event. For example, an advertisement urging support for the proposed agreement can follow the video disruption.

FIG. 1 shows various aspects of an exemplary environment in which the present methods and systems can operate. One skilled in the art will appreciate that provided herein is a functional description and that the respective functions can be performed by software, hardware, or a combination of software and hardware. The network and system can comprise a user device 102 in communication with a computing device, such as a content server 104, for example. The content server 104 can be disposed locally or remotely relative to the user device 102. As an example, the user device 102 and the content server 104 can be in communication via a private and/or public network 105 such as the Internet or a local area network. Other forms of communications can be used such as wired and wireless telecommunication channels, for example. As a particular example, the network 105 can comprise a cellular network.

The user device 102 can be an electronic device such as a computer, a smartphone, a laptop, a tablet, a set top box, a display device, or other device capable of communicating with the content server 104. As an example, the user device 102 can comprise a local memory 106. The content server 104 can transmit content 110 to the user device 102 through the network 105. The content 110 can comprise one or more advertisements 108. The one or more advertisements 108 can be spliced into the content 110 prior to reception of the content 110 by the user device 102. The one or more advertisements 108 can be extracted from the content 110. In another aspect, the one or more advertisements 108 can be delivered to the user device 102 separately from the content 110. The one or more advertisements 108 can be delivered to the user device 102 from an advertisement server 112, via the network 105. The one or more advertisements 108 can be stored locally in the memory 106 of the user device 102. Other software, hardware, and/or interfaces can be used to provide communication between the user device 102 and the content server 104.

The one or more advertisements 108 can be related to the content 110. For example, if the content 110 is aimed at a 5-8 year old girl, then the one or more advertisements 108 can be aimed at a 5-8 year old girl. In another example, if the content 110 comprises a particular program, then the one or more advertisements 108 can comprise an advertisement for accessories for the program, such as action figures. As a program in the content 110 ends, the one or more advertisements 108 can be updated. As a tuned channel changes, the one or more advertisements 108 can be updated. The one or more advertisements 108 can be updated before each commercial break to include the advertisements scheduled to run at the next commercial break. The one or more advertisements 108 can run in a first in, first out manner. In an aspect, one of the one or more advertisements 108 can remain in the local memory 106 until the one of the one or more advertisements 108 is presented. The one or more advertisements 108 can comprise one or more tags. The one or more tags can indicate a demographic associated with an advertisement 108. The one or more tags can indicate a date associated with an advertisement 108. The date can be a date the advertisement was stored locally, a date the advertisement was released, and/or a date the advertisement will no longer be relevant and should be replaced. The one or more tags can indicate a product and/or a company associated with an advertisement 108.

Figure 2:
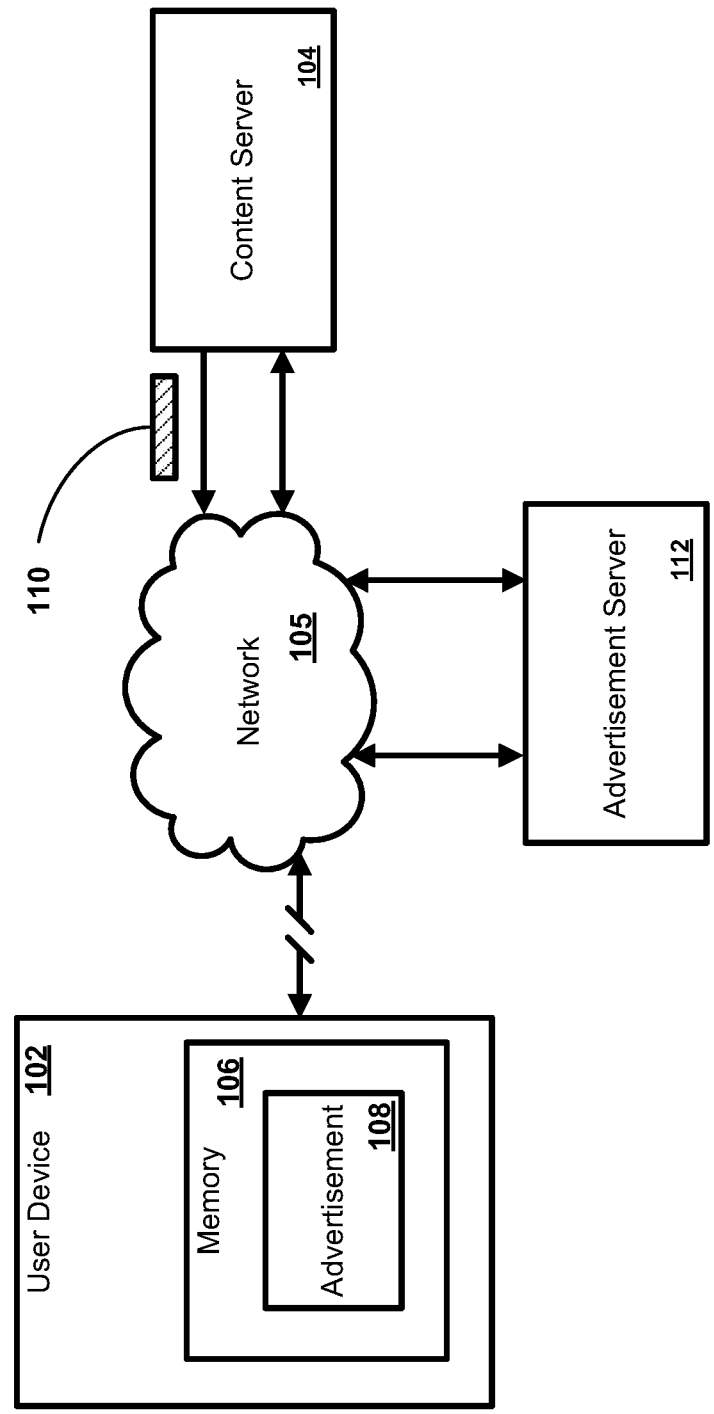
FIG. 2 is a block diagram of an exemplary system and network.

FIG. 2 shows a block diagram where the network 105 experiences a disruption and the content 110 from the content server 104 cannot be delivered to the user device 102. At least one portion of the network 105 might be unreliable. As an example, the user device 102 can be used within a moving vehicle with the network 105 providing connectivity to the vehicle and/or the devices therein, resulting in an unreliable connection. As another example, the network can be unreliable because of a weak connection between the content server 104 and the user device 102. As examples, the disruption can comprise a nonfunctioning (e.g., down, severed, dead, etc.) network link, a nonfunctioning (e.g., nonresponsive, dead, etc.) network device, and the like. The disruption can be the caused by severe weather. The disruption can comprise entering a location of sparse coverage of the network 105. In response to the disruption of the network 105, an advertisement 108 stored in the local memory 106 of the user device 102 can be presented. The presented advertisement 108 can be used to mask (e.g., conceal, hide, etc.) the disruption in the network 105.

The user device 102 can access an advertisement database locally to select the advertisement 108. The user device 102 can select an appropriate advertisement based on the content 110 presented prior to the disruption. The user device 102 can determine a demographic based on the content 110 presented prior to the disruption. The user device 102 can select the advertisement 108 based on the determined demographic. The user device 102 can compare the demographics in the tags of the one or more advertisements 108 with the determined demographic to determine an appropriate advertisement.

The user device 102 can determine a current date and compare the dates in the tags of the one or more advertisements 108 with the current date. Any advertisement with a date that exceeds the current date can be excluded from consideration as the selected advertisement. Any advertisement with a date that predates the current date can be excluded from consideration as the selected advertisement. Any advertisement with a date that exceeds the current date can be included for consideration as the selected advertisement. Any advertisement with a date that predates the current date can be included for consideration as the selected advertisement.

The user device 102 can determine a title and/or a source of the content 110. The user device 102 can compare the title and/or the source with the products and/or companies in the tags of the one or more advertisements 108. The selected advertisement can be selected from the advertisements that resulted in a match during the comparison. The comparison can include a comparison with an affiliate list. The selected advertisement can be selected from the advertisements that resulted in a match during the comparison with the affiliate list. The comparison can include a comparison with a competitor list. Any advertisements that resulted in a match during the comparison with the competitor list can be excluded from consideration as the selected advertisement.

The selected advertisement can be displayed on a user device (e.g., a television, a monitor, a mobile device, a tablet, a smart phone, a smart watch, a wearable device, a vehicle, a display device, combinations thereof, etc.). In response to completion of displaying the selected advertisement, if the disruption is fixed then service can return to normal. If the disruption is not fixed then a second advertisement can be selected using the methods described above. An advertisement can continue to be selected and displayed until the disruption is fixed. If all of the locally stored advertisements are played during a disruption, then the advertisements can be displayed again in the order the advertisements were selected or in another order (e.g., in a random order).

Figure 3:
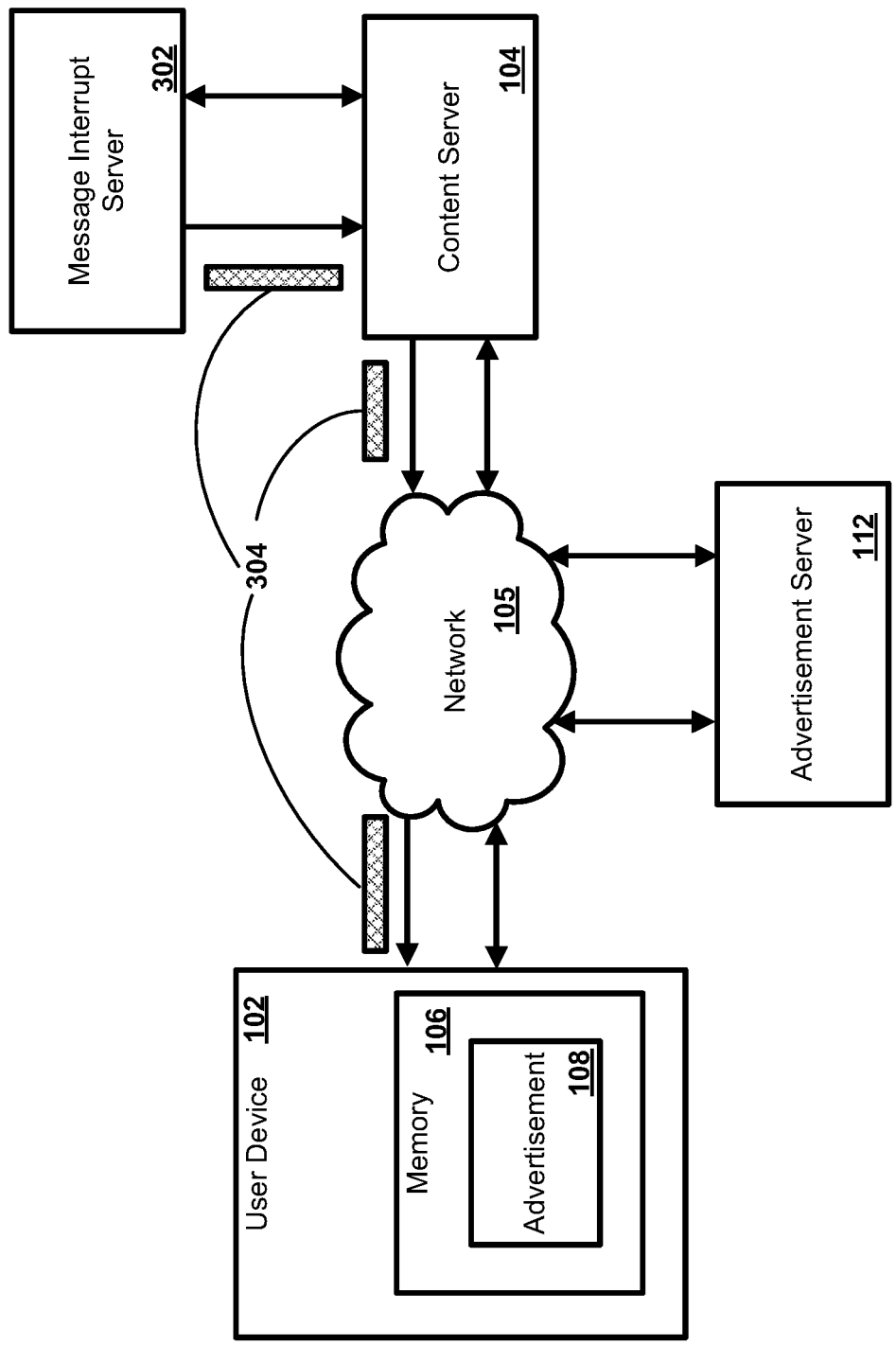
FIG. 3 is a block diagram of an exemplary system and network.

FIG. 3 shows an example block diagram of providing advertisement content in response to an alert. Content delivered by the content server 104 can be interrupted by alert content 304 initiated by a message interrupt server 302. The message interrupt server 302 can prevent (e.g., stop, cease, pause, etc.) the content server 104 from transmitting content to the user device 102. The message interrupt server 302 can cause the user device 102 to stop rendering content. The message interrupt server 302 can cause the user device 102 to buffer content received from the content server 104 and display alert content provided by the message interrupt server 302. After the alert content and any accompanying advertisements have been displayed, the user device 102 can play the buffered content. The message interrupt server 302 can transmit the alert content to the user device through the network 105. The alert content 304 can be related to an emergency. The alert content 304 can be related to a message from the Emergency Information Service (EIS). The alert content 304 can be related to an Amber Alert. The alert content 304 can be related to a political message. The alert content 304 can be related to an address from a politician. In an aspect, an advertisement can follow the alert content 304. The advertisement can be spliced into the alert content 304. The advertisement can comprise an overlay over the alert content 304. The alert content 304 can comprise an overlay over the advertisement. The advertisement can be a locally stored advertisement 108. The advertisement can be contextually related to the alert content 304.

The user device 102 can access an advertisement database locally to select the advertisement 108. The user device 102 can select an appropriate advertisement based on the alert content 110. The user device 102 can determine a demographic based on the alert content 302. For example, a determination could be made that the alert content 302 is particularly interesting to senior citizens. In a further aspect, the user device 102 can select the advertisement 108 based on the determined demographic. The user device 102 can compare the demographics in the tags of the one or more advertisements 108 with the determined demographic to determine an appropriate advertisement.

The user device 102 can determine a current date and compare the dates in the tags of the one or more advertisements 108 with the current date. Any advertisement with a date that exceeds the current date can be excluded from consideration as the selected advertisement. Any advertisement with a date that predates the current date can be excluded from consideration as the selected advertisement. Any advertisement with a date that exceeds the current date can be included for consideration as the selected advertisement. Any advertisement with a date that predates the current date can be included for consideration as the selected advertisement.

The selected advertisement can be displayed on the user device 102 (e.g., a television, a monitor, a mobile device, a tablet, a smart phone, a smart watch, a wearable device, a vehicle, a display device, combinations thereof, etc.). If the disruption is fixed when the selected advertisement finishes displaying, then user device 102 can return to receiving content from the content server 104. If the disruption is not fixed when the selected advertisement finishes displaying, then the user device 102 can select a second advertisement using the methods described above. The user device 102 can continue to select and display an advertisement until the disruption is fixed. If the user device 102 plays all of the locally stored advertisements during the disruption, then user device 102 can display the advertisements again in the order the advertisements were selected or in another order (e.g., random).

Figure 4:
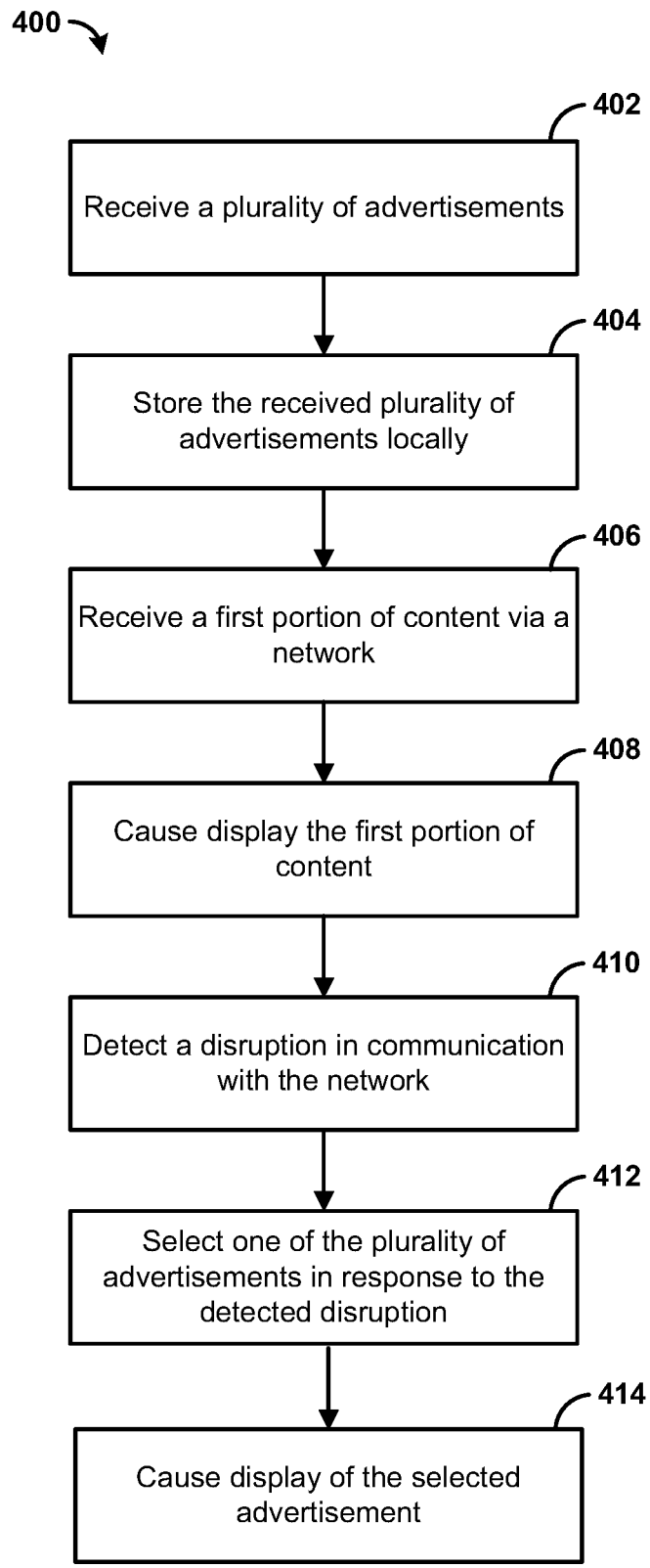
FIG. 4 is a flow chart of an exemplary method.

FIG. 4 shows an exemplary method 400, executing on one or more user device 102. At step 402, a plurality of advertisements can be received. The plurality of advertisements can be received by a user device. The user device can be, for example, a television, a monitor, a mobile device, a tablet, a smart phone, a smart watch, a wearable device, a vehicle, a display device, combinations thereof, etc. The plurality of advertisements can be received by a user device 102 used within a moving vehicle with a network (e.g., the network 105) providing connectivity to the vehicle and/or the devices therein. In some aspects, the plurality of advertisements can be received through the network. In some aspects, the network can comprise a cellular network.

At step 404, the received plurality of advertisements can be stored locally. The received plurality of advertisements can be stored in the user device. The plurality of advertisements can comprise metadata. The metadata can comprise a tag. The stored plurality of advertisements can comprise a tag. The tag can comprise a timestamp indicating a date and/or time. The date and/or time can refer to an expiration date, a date that the corresponding advertisement should not be used until, a date the advertisement was stored locally, etc. A determination can be made that the date and/or time (e.g., the timestamp) of the tag of one of the stored advertisements has expired.

The metadata can represent one or more spots reserved for advertisements. The metadata can be a pointer to any type of advertising asset (e.g., a banner advertisement, a bug, a web page, etc.). The pointer can be used to retrieve the advertising asset. A determination can be made that the date and/or time of the tag of one of the stored advertisements has expired. The metadata can comprise a pointer to any type of advertising asset, such as a banner ad, bug, web page, etc. The metadata of an advertisement can describe the respective advertisement.

A request for a new advertisement can be transmitted. For example, the request can be transmitted based on the determination that a timestamp associated with the one of the stored advertisements is expired. The new advertisement can be received. The one of the stored advertisements can be removed from storage. The new advertisement can be stored. The locally stored advertisements can be uniquely addressable. A determination can be made that one or more of the locally stored advertisements need to be replaced based on factors, such as how many times a user has seen the advertisement in the past. A determination can also be made that one or more of the locally stored advertisements needs to be replaced by comparing the current time to the one or more corresponding tags.

At step 406, a first portion of content can be received via the network, for example, via a wireless network. A connection to the network can comprise a connection to a vehicle. The connection to the network can comprise a connection to a user device 102 in a vehicle. The first portion of content can comprise a plurality of windows of scheduled commercial breaks. The first portion of content can comprise video. The first portion of content can be received as linear content (e.g., by tuning to a channel). The first portion of content can be received from a video on demand server.

At step 408, the user device can cause the received first portion of content to be displayed. Causing the first portion of content to be displayed can comprise, for example, causing the first portion of content to be displayed at a vehicle and/or causing the first portion of content to be displayed at a user device 102 in a vehicle. At step 410, a disruption in communication with the network can be detected. The disruption can comprise a nonfunctioning (e.g., down, severed, dead, etc.) network link. The disruption can comprise a nonfunctioning (e.g., nonresponsive, dead, etc.) network device. The disruption can be caused by severe weather. The disruption can comprise entering a location of sparse to no coverage of the network. The disruption can result from overuse of the network. The disruption can result from overuse of a service, such as a video streaming service. The disruption can result from issues, such as DNS issues, router configuration issues, or the like. The disruption can result from failures, such as a hardware failure, a software failure, or the like.

At step 412, one of the plurality of advertisements can be selected in response to the detected disruption. The one of the plurality of advertisements can be selected in a first in first out (FIFO) fashion. The one of the plurality of advertisements can be selected in a last in first out (LIFO) fashion. The one of the plurality of advertisements with a closest time to expiration in the tag can be selected. The selection can comprise a priority component. For example, the tags of the plurality of advertisements can comprise a field representing a priority and the selected advertisement can be the advertisement with the highest priority in the field.

In some aspects, the selection of the one of the plurality of advertisements can comprise selecting the advertisement based on the tags. For example, selecting the advertisement can comprise determining a demographic associated with the content and selecting an advertisement of the plurality of advertisements comprising a tag that matches (e.g., complements, coincides with, etc.) the determined demographic.

If a particular advertisement is playing during the disruption and the particular advertisement is also stored locally, then the particular advertisement can be selected. The particular advertisement can begin play at the time spot where the disruption occurred. If a particular advertisement is set to be displayed later, and the particular advertisement is also stored locally, then the particular advertisement can be selected. If an advertisement associated with a particular merchant is playing during the disruption and an additional advertisement associated with the particular merchant is also stored locally, then the additional advertisement can be selected. The additional advertisement can begin play at the spot where the disruption occurred. If an advertisement associated with a particular merchant is set to be displayed later, and an additional advertisement associated with the particular merchant is also stored locally, then the additional advertisement can be selected.

The selection of the advertisement can be performed in such a way to reduce billing complications associated with the disruption. Information used in selection of the advertisement can be transmitted prior to the disruption. The particular advertisement playing can finish playing if the entirety of the particular advertisement is stored in a local buffer. After the particular advertisement finishes, a new advertisement can be selected. The new advertisement can be selected using any method described herein.

At step 414, the user device can cause the selected advertisement to be displayed. The first portion of content can comprise a plurality of windows of scheduled commercial breaks. Displaying the selected advertisement can comprise displaying the selected advertisement outside of the plurality of windows of scheduled commercial breaks. Causing display of the selected advertisement can mask the disruption.

When display of the selected advertisement is complete, if the disruption is not resolved, another advertisement can be selected and can be caused to be displayed. A pattern of advertisement selection and display can continue until the disruption is resolved.

In some aspects, a second portion of content can be received via the network. The second portion of content can comprise a plurality of windows of scheduled commercial breaks. The second portion of content can comprise video. The second portion of content can be received from a channel. The second portion of content can be received from a video on demand server. In some aspects the second portion of content can follow the first portion of content temporally. In some aspects, the second portion of content can be received subsequent to resolution of the disruption.

In some aspects, the user device can cause the received second portion of content to be displayed. Causing the second portion of content to be displayed can comprise, for example, causing the second portion of content to be displayed at a vehicle and/or causing the second portion of content to be displayed at a user device 102 in a vehicle. In some aspects, causing the second portion of content to be displayed can comprise causing interruption of the display of the selected advertisement to cause display of the second portion of the content. In other aspects, causing the second portion of content to be displayed can comprise buffering the second portion of content at least during display of the selected advertisement and causing display of the second portion of the content responsive to completion of the display of the selected advertisement.

Figure 5:
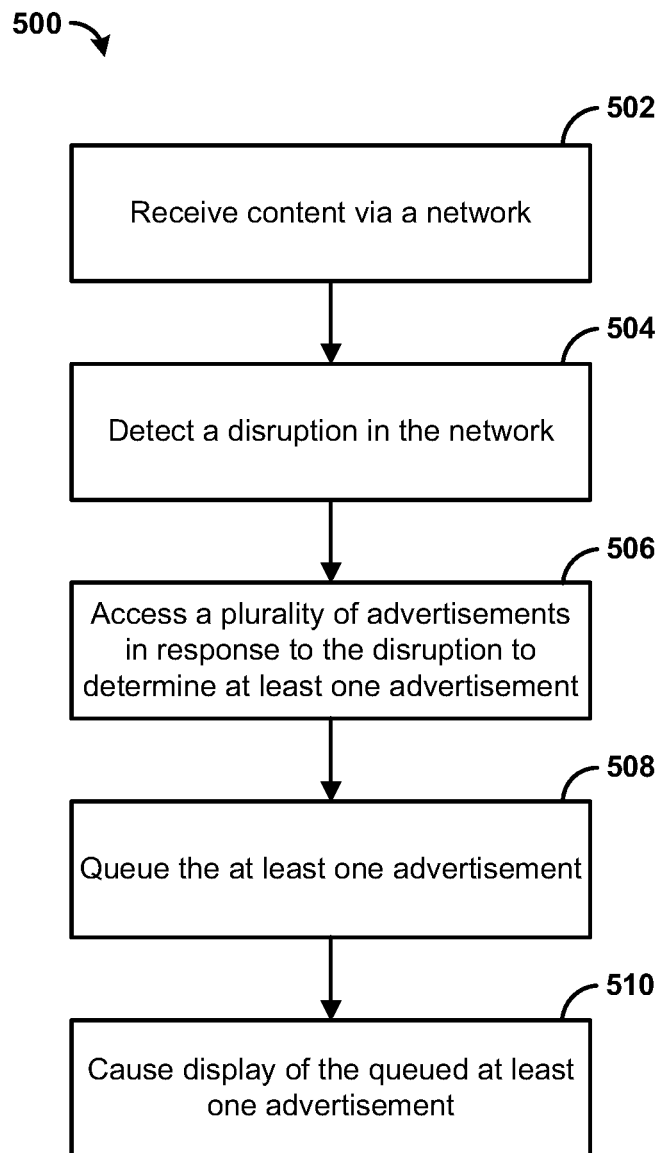
FIG. 5 is a flow chart of an exemplary method.

FIG. 5 shows another exemplary method 500. In some aspects, the method 500 can be executed by a service and/or content provider. At step 502, content can be received via a network. For example, the content can be received via a wireless network. As a particular example, the network can comprise a cellular network. A connection to the network can comprise a connection to a vehicle. The connection to the network can comprise a connection to a user device 102 in a vehicle. The content can comprise a plurality of windows of scheduled commercial breaks. The content can comprise video. The content can be received from a channel. The content can be received from a video on demand server.

At step 504, a disruption in the network can be detected. The disruption can comprise a nonfunctioning (e.g., down, severed, dead, etc.) network link. The disruption can comprise a nonfunctioning (e.g., nonresponsive, dead, etc.) network device. The disruption can be caused by severe weather. The disruption can comprise entering a location of sparse to no coverage of the network. The disruption can result from overuse of the network. The disruption can result from overuse of a service, such as a video streaming service. The disruption can result from issues, such as DNS issues, router configuration issues, or the like. The disruption can result from failures, such as a hardware failure, a software failure, or the like.

At step 506, a plurality of advertisements can be accessed in response to the detected disruption. In some aspects, the plurality of advertisements can be stored locally at the user device. The user device can determine at least one advertisement of the plurality of advertisements that is relevant to the received content.

In some aspects, the plurality of advertisements can each comprise one or more tags. Determining at least one advertisement of the plurality of advertisements that is relevant to the received content can comprise matching metadata of the received content with at least one tag of the plurality of advertisements.

At step 508, the determined at least one advertisement can be queued. In some aspects, the determined at least one advertisement can be queued in a first in first out (FIFO) fashion. The determined at least one advertisement can be queued in a last in first out (LIFO) fashion. The determined at least one advertisement can be queued based on expiration times of the at least one advertisement. The determined at least one advertisement can be queued based on a priority component. For example, the tags of the plurality of advertisements can comprise a field representing a priority and the determined at least one advertisement can be queued according to the priority in the field. In some aspects, queuing the at least one advertisement can comprise generating a list of at least one reference to a local storage location of the at least one advertisement.

At step 510, the user device can cause the queued at least one advertisement to be displayed. The received content can comprise a plurality of windows of scheduled commercial breaks. Displaying the queued at least one advertisement can comprise displaying the queued at least one advertisement outside of the plurality of windows of scheduled commercial breaks. In some aspects, the causing display of the queued at least advertisement can comprise causing display of the queued at least one advertisement for a period of time associated with the disruption. For example, the period of time associated with the disruption can comprise an amount of time that the network is unavailable because of the disruption. Causing display of the queued at least advertisement can mask the disruption.

In some aspects, the user device can receive additional content via the network. The additional content can comprise a plurality of windows of scheduled commercial breaks. The additional content can comprise video. The additional content can be received as linear content (e.g., by tuning to a channel). The additional content can be received from a video on demand server. In some aspects the additional content can follow the first portion of content temporally. In some aspects, the additional content can be received subsequent to resolution of the disruption.

In some aspects, in response to receiving the additional content, the user device can cause interruption of the display of the queued at least one advertisement to cause display of the additional content.

Figure 6:
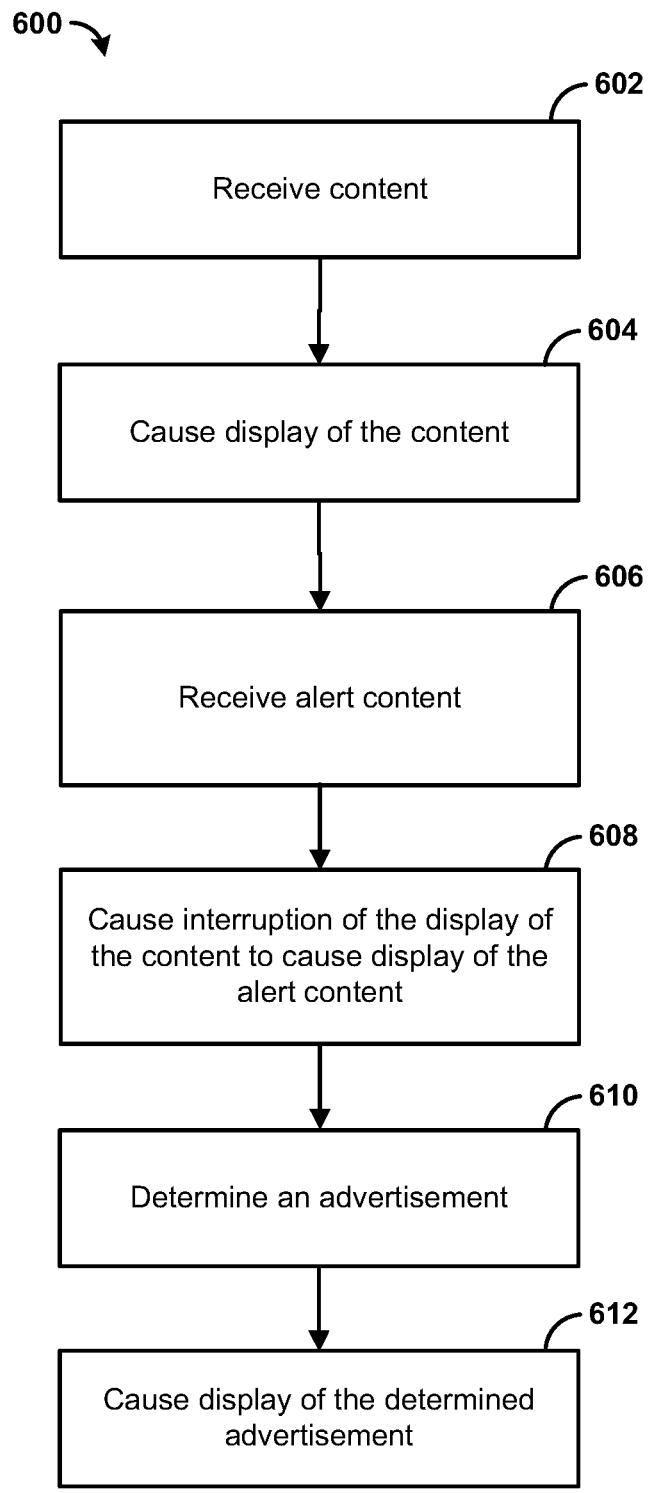
FIG. 6 is a flow chart of an exemplary method.

FIG. 6 shows another exemplary method 600. At step 602, content can be received. In some aspects, the content can be received via a network at a user device. For example, the content can be received via a wireless network. As a particular example, the network can comprise a cellular network. The user device can be, for example, a television, a monitor, a mobile device, a tablet, a smart phone, a smart watch, a wearable device, a vehicle, a display device, combinations thereof, etc. A connection to the network can comprise a connection to a vehicle. The connection to the network can comprise a connection to a user device 102 in a vehicle. The content can comprise a plurality of windows of scheduled commercial breaks. The content can comprise video. The content can be received from a channel. The content can be received from a video on demand server.

In step 604, the user device can cause the content to be displayed. The content can be displayed on the user device (e.g., a television, a monitor, a mobile device, a tablet, a smart phone, a smart watch, a wearable device, a vehicle, a display device, combinations thereof, etc.). In some aspects, the content can be delivered to the user device 102 in a vehicle.

At step 606, alert content can be received via the network. In some aspects, the alert content can be received during the display of the content. The alert content can be related to an emergency. The alert content can be related to a message from the Emergency Information Service (EIS), a political message, an address from a politician, and the like. The alert content can be in response to any trigger generated by any system. A trigger can be an action in social media, a content trigger (e.g., a noteworthy event/action occurring in video content), and/or the like. For example, actions in social media, such as indications that Tiger Woods just sank a putt, can cause a change in advertising. The alert content can be generated to indicate that an advertisement should be inserted into a stream in response to the trigger. The alert content can be transmitted to the advertisement server. An algorithm can be used to evaluate the alert content in real-time to extract pertinent information about the content. Video of the alert content can be analyzed in real-time to determine the nature of the content. Real-time analysis of the alert content can be used to determine where in the alert content advertisements should be placed. The alert content and/or a trigger can cause an advertisement relevant to the alert content to be inserted into the alert content. Other triggers can comprise network outages, Amber Alerts, Emergency Alert System (EAS), breaking news, political addresses, etc. An advertisement decision service can change the scheduling of advertising based on the trigger and/or alert.

If the trigger indicates a network outage, a playlist of content and/or advertising can be stored locally at the client. When the trigger indicating a network outage is received, a pre-determined advertisement can be retrieved remotely and played, or an advertisement can be selected and played from the locally stored advertisements.

At step 608, the user device can cause the alert content to be displayed. In some aspects, causing display of the alert content can comprise causing interruption of display of the content. In some aspects, the causing display of the alert content can be performed in response to receiving the alert content in step 606. As examples, the alert content can be presented in place of the content. As other examples, the alert content can be presented as an audio message with the content, as an overlay with the content, as a scrolling crawl with the content, in the lower third of the content, on a second screen, via an HTML page, on a billboard, on social media, and/or the like. The alert content can take the form of a text message, an audio message, a video message, and/or a tactile message.

At step 610, an advertisement of a plurality of locally stored advertisements can be determined (e.g., identified) based on the alert content. The alert content can comprise metadata. The metadata can be extracted and analyzed. The determined advertisement can be identified based on the metadata. The metadata can comprise closed captioning. The advertisement can be identified based on the closed captioning. Content, such as the nightly news for instance, can be analyzed. For example, a determination that someone was shot can be made based on the analysis. The alert content can be sent to an advertisement decision service as metadata. The Advertisement Decision Service can use the alert content in conjunction with customer data to make individualized advertisement selections for a customer. For example, if the customer is a National Rifle Association (NRA) member, the Advertisement Decision Service can transmit a pro-gun advertisement to the customer's device. If the customer is a member of People for the Ethical Treatment of Animals (PETA), then the Advertisement Decision Service can transmit an anti-gun advertisement to the customer. In the example of the nightly news reporting a shooting, the trigger (e.g., a content trigger) can comprise the report of the shooting and the Advertisement Decision Service can use the trigger event to determine that now would be a good time to display an advertisement and the unique advertisements can be displayed based on customer data. The advertisement can be contextually related to the alert content. The advertisement can be contextually different from the alert content. The advertisement can be contextually opposite from the alert content. For example, the alert content can comprise a message supporting gun control and the advertisement can comprise a message from a gun owners' rights group. An advertisement can follow the alert content. The advertisement can be spliced into the alert content. The advertisement can comprise an overlay over the alert content. The alert content can comprise an overlay over the advertisement.

At step 612, the user device can cause the determined advertisement to be displayed. The causing the determined advertisement to be displayed can comprise causing the advertisement to be displayed on a user device. Following the display of the advertisement, the content can resume display.

Figure 7:
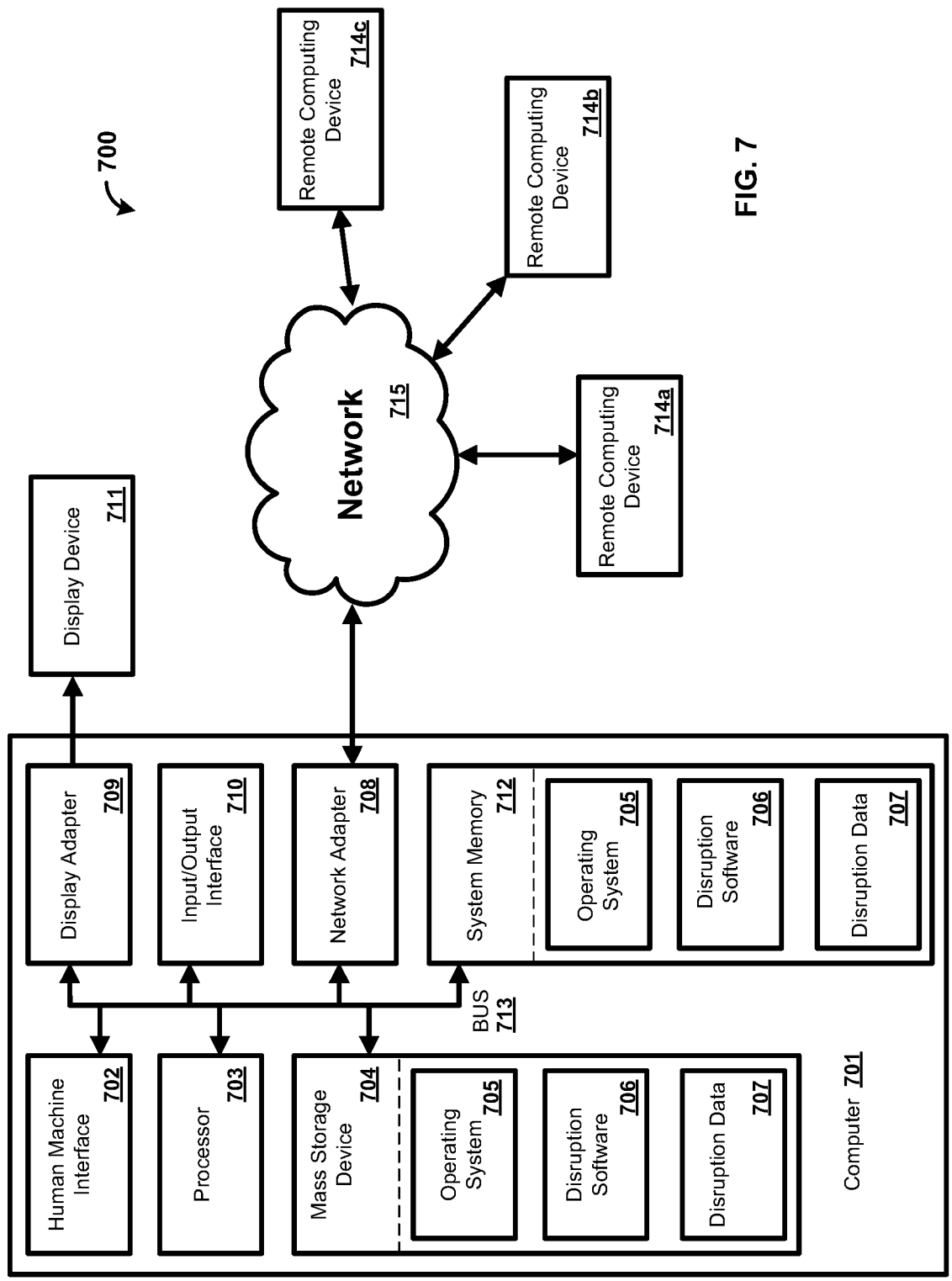
FIG. 7 is a block diagram of an exemplary computing device.

In an exemplary aspect, the methods and systems can be implemented on a computer 701 as illustrated in FIG. 7 and described below. By way of example, content server 104 of FIG. 1 can be a computer as illustrated in FIG. 7. Similarly, the methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703, a system memory 712, and a system bus 713 that couples various system components including the one or more processors 703 to the system memory 712. 703. The system can utilize parallel computing.

The system bus 713 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the one or more processors 703, a mass storage device 704, an operating system 705, disruption software 706, disruption data 707, a network adapter 708, the system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as the disruption data 707 and/or program modules such as the operating system 705 and the disruption software 706 that are immediately accessible to and/or are presently operated on by the one or more processors 703.

In another aspect, the computer 701 can also comprise other removable/non-removable, volatile/non-volatile computer storage media. By way of example, FIG. 7 illustrates the mass storage device 704 which can provide non-volatile storage of computer code, computer readable instructions, data structures, program modules, and other data for the computer 701. For example and not meant to be limiting, the mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, the operating system 705 and the disruption software 706. Each of the operating system 705 and the disruption software 706 (or some combination thereof) can comprise elements of the programming and the disruption software 706. The disruption data 707 can also be stored on the mass storage device 704. The disruption data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 703 via the human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, the display device 711 can also be connected to the system bus 713 via an interface, such as the display adapter 709. It is contemplated that the computer 701 can have more than one display adapter 709 and the computer 701 can have more than one display device 711. For example, the display device 711 can be a monitor, an LCD (Liquid Crystal Display), or a projector. In addition to the display device 711, other output peripheral devices can comprise components such as speakers (not shown) and a printer (not shown) which can be connected to the computer 701 via the Input/Output Interface 710. Any step and/or result of the methods can be output in any form to an output device. Such output can be any form of visual representation, including, but not limited to, textual, graphical, animation, audio, tactile, and the like. The display device 711 and computer 701 can be part of one device, or separate devices.

The computer 701 can operate in a networked environment using logical connections to one or more remote computing devices 714a,b,c. By way of example, a remote computing device can be a personal computer, portable computer, smartphone, a server, a router, a network computer, a peer device or other common network node, and so on. Logical connections between the computer 701 and a remote computing device 714a,b,c can be made via a network 715, such as a local area network (LAN) and/or a general wide area network (WAN). Such network connections can be through the network adapter 708. The network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the one or more processors 703 of the computer. An implementation of the disruption software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   storing, at a computing device, a plurality of advertisements associated with first content;
   receiving an indication of an event associated with output of the first content; and
   causing, based on the event, at least one advertisement of the plurality of advertisements to be removed from local storage and replaced in the local storage with at least one other advertisement.

2. The method of claim 1, wherein the event comprises at least one of:
   a channel change, wherein the at least one other advertisement is associated with content output via a channel associated with the channel change;
   a commercial break, wherein the at least one other advertisement is associated with at least one portion of the commercial break;
   a social media event associated with the first content, wherein the at least one other advertisement is associated with the social media event;
   an action occurring within the first content, wherein the at least one other advertisement is associated with the action; or
   a network issue associated with delivery of the first content to a user device for output.

3. The method of claim 1, wherein the indication of the event comprises at least one of:
   an indication of a boundary for the first content, wherein the at least one other advertisement is associated with second content; or
   an indication of a boundary for the second content, wherein the at least one other advertisement is associated with the second content.

4. The method of claim 1, wherein the event is contextually related to the at least one other advertisement.

5. The method of claim 1, wherein causing the at least one advertisement to be removed from the local storage and replaced in the local storage comprises at least one of:
   determining, based on a time associated with the at least one advertisement, that the at least one advertisement is expired, wherein the at least one other advertisement is unexpired;
   determining, based on a demographic associated with second content, the at least one other advertisement, wherein the at least one other advertisement is associated with the demographic associated with the second content, and wherein the demographic associated with the second content differs from a demographic associated with the first content;
   determining, based on first metadata associated with the first content, the at least one other advertisement, wherein the at least one other advertisement comprises advertisement metadata associated with the first metadata; or
   determining, based on first advertisement metadata associated with the at least one advertisement, the at least one other advertisement, wherein the at least one other advertisement comprises second advertisement metadata associated with the first advertisement metadata.

6. The method of claim 1, wherein causing the at least one advertisement to be removed from the local storage and replaced in the local storage comprises determining, based on a current date, the at least one other advertisement, wherein the at least one other advertisement is associated with: a date that predates the current date or a date that exceeds the current date.

7. The method of claim 1, further comprising: based on an issue associated with output of the first content, and based on an association between alert metadata for alert content and advertisement metadata for a second advertisement of the plurality of advertisements, cause output of the alert content and the second advertisement, wherein the advertisement metadata for the second advertisement is associated with content metadata for the first content.

8. An apparatus comprising:
one or more processors; and
memory storing processor executable instructions that, when executed by the one or more processors, cause the apparatus to:
store a plurality of advertisements associated with first content;
receive an indication of an event associated with output of the first content; and
cause, based on the event, at least one advertisement of the plurality of advertisements to be removed from local storage and replaced in the local storage with at least one other advertisement.

9. The apparatus of claim 8, wherein the event comprises at least one of:
a channel change, wherein the at least one other advertisement is associated with content output via a channel associated with the channel change;
a commercial break, wherein the at least one other advertisement is associated with at least one portion of the commercial break;
a social media event associated with the first content, wherein the at least one other advertisement is associated with the social media event;
an action occurring within the first content, wherein the at least one other advertisement is associated with the action; or
a network issue associated with delivery of the first content to a user device for output.

10. The apparatus of claim 8, wherein the indication of the event comprises at least one of:
an indication of a boundary for the first content, wherein the at least one other advertisement is associated with second content; or
an indication of a boundary for the second content, wherein the at least one other advertisement is associated with the second content.

11. The apparatus of claim 8, wherein the event is contextually related to the at least one other advertisement.

12. The apparatus of claim 8, wherein the processor executable instructions that cause the apparatus to cause the at least one advertisement to be removed from the local storage and replaced in the local storage further cause the apparatus to at least one of:
determine, based on a time associated with the at least one advertisement, that the at least one advertisement is expired, wherein the at least one other advertisement is unexpired;
determine, based on a demographic associated with second content, the at least one other advertisement, wherein the at least one other advertisement is associated with the demographic associated with the second content, and wherein the demographic associated with the second content differs from a demographic associated with the first content;
determine, based on first metadata associated with the first content, the at least one other advertisement, wherein the at least one other advertisement comprises advertisement metadata associated with the first metadata; or
determine, based on first advertisement metadata associated with the at least one advertisement, the at least one other advertisement, wherein the at least one other advertisement comprises second advertisement metadata associated with the first advertisement metadata.

13. The apparatus of claim 8, wherein the processor executable instructions that cause the apparatus to cause the at least one advertisement to be removed from the local storage and replaced in the local storage further cause the apparatus to determine, based on a current date, the at least one other advertisement, wherein the at least one other advertisement is associated with: a date that predates the current date or a date that exceeds the current date.

14. The apparatus of claim 8, wherein the processor executable instructions further cause the apparatus to: based on an issue associated with output of the first content, and based on an association between alert metadata for alert content and advertisement metadata for a second advertisement of the plurality of advertisements, cause output of the alert content and the second advertisement, wherein the advertisement metadata for the second advertisement is associated with content metadata for the first content.

15. One or more non-transitory computer readable media storing processor executable instructions that, when executed by at least one processor, cause the at least one processor to:
store a plurality of advertisements associated with first content;
receive an indication of an event associated with output of the first content; and
cause, based on the event, at least one advertisement of the plurality of advertisements to be removed from local storage and replaced in the local storage with at least one other advertisement.

16. The one or more non-transitory computer readable media of claim 15, wherein the event comprises at least one of:
a channel change, wherein the at least one other advertisement is associated with content output via a channel associated with the channel change;
a commercial break, wherein the at least one other advertisement is associated with at least one portion of the commercial break;
a social media event associated with the first content, wherein the at least one other advertisement is associated with the social media event;
an action occurring within the first content, wherein the at least one other advertisement is associated with the action; or
a network issue associated with delivery of the first content to a user device for output.

17. The one or more non-transitory computer readable media of claim 15, wherein the indication of the event comprises at least one of:
an indication of a boundary for the first content, wherein the at least one other advertisement is associated with second content; or
an indication of a boundary for the second content, wherein the at least one other advertisement is associated with the second content.

18. The one or more non-transitory computer readable media of claim 15, wherein the event is contextually related to the at least one other advertisement.

19. The one or more non-transitory computer readable media of claim 15, wherein the processor executable instructions that cause the at least one processor to cause the at least one advertisement to be removed from the local storage and replaced in the local storage further cause the at least one processor to at least one of:

determine, based on a time associated with the at least one advertisement, that the at least one advertisement is expired, wherein the at least one other advertisement is unexpired;

determine, based on a demographic associated with second content, the at least one other advertisement, wherein the at least one other advertisement is associated with the demographic associated with the second content, and wherein the demographic associated with the second content differs from a demographic associated with the first content;

determine, based on first metadata associated with the first content, the at least one other advertisement, wherein the at least one other advertisement comprises advertisement metadata associated with the first metadata; or determine, based on first advertisement metadata associated with the at least one advertisement, the at least one other advertisement, wherein the at least one other advertisement comprises second advertisement metadata associated with the first advertisement metadata.

20. The one or more non-transitory computer readable media of claim 15, wherein the processor executable instructions that cause the at least one processor to cause the at least one advertisement to be removed from the local storage and replaced in the local storage further cause the at least one processor to determine, based on a current date, the at least one other advertisement, wherein the at least one other advertisement is associated with: a date that predates the current date or a date that exceeds the current date.

21. The one or more non-transitory computer readable media of claim 15, wherein the processor executable instructions further cause the at least one processor to: based on an issue associated with output of the first content, and based on an association between alert metadata for alert content and advertisement metadata for a second advertisement of the plurality of advertisements, cause output of the alert content and the second advertisement, wherein the advertisement metadata for the second advertisement is associated with content metadata for the first content.

22. An apparatus comprising:
one or more processors; and
memory storing processor executable instructions that, when executed by the one or more processors, cause the apparatus to:

store a plurality of advertisements and advertisement metadata for each advertisement of the plurality of advertisements; and based on an issue associated with output of content, and based on an association between alert metadata for alert content and the advertisement metadata for an advertisement of the plurality of advertisements, cause output of the alert content and the advertisement, wherein the advertisement metadata for the advertisement is associated with content metadata for the content.

23. The apparatus of claim 22, wherein the processor executable instructions that cause the apparatus to cause output of the alert content and the advertisement further cause the apparatus to:
cause output of the advertisement as an overlay over the alert content;
cause output of the alert content as an overlay over the advertisement; or
cause output of the advertisement following output of the alert content.

24. The apparatus of claim 22, wherein the processor executable instructions further cause the apparatus to:
receive, during output of the alert content, a portion of the content; and
based on a completion of the alert content, cause output of the portion of the content.

25. The apparatus of claim 22, wherein the alert metadata comprises at least one alert information tag associated with the advertisement metadata.

26. The apparatus of claim 22, wherein at least one of:
the advertisement metadata comprises at least one advertisement information tag associated with the alert metadata, or
the content metadata comprises at least one content information tag associated with the advertisement metadata for the advertisement.

27. The apparatus of claim 22, wherein the alert content comprises at least one of:
an Amber Alert;
an emergency message;
a message from an emergency information service;
a weather notification;
a political address; or
a political message.

* * * * *